United States Patent
Weiss

(10) Patent No.: US 9,830,567 B2
(45) Date of Patent: Nov. 28, 2017

(54) TASK MANAGEMENT SYSTEM AND METHOD

(71) Applicant: WaveMarket, Inc., Emeryville, CA (US)

(72) Inventor: Andrew Weiss, San Ramon, CA (US)

(73) Assignee: Location Labs, Inc., Emeryville, CA (US)

( * ) Notice: Subject to any disclaimer, the term of this patent is extended or adjusted under 35 U.S.C. 154(b) by 463 days.

(21) Appl. No.: 14/062,888

(22) Filed: Oct. 25, 2013

(65) Prior Publication Data

US 2015/0120349 A1 Apr. 30, 2015

(51) Int. Cl.
*G06Q 10/00* (2012.01)
*G06Q 10/06* (2012.01)

(52) U.S. Cl.
CPC ............... *G06Q 10/06311* (2013.01)

(58) Field of Classification Search
CPC . H04W 4/00–99/00; H04L 1/00–69/00; G06Q 10/00–99/00
USPC ................................. 705/7.11–7.42
See application file for complete search history.

(56) References Cited

U.S. PATENT DOCUMENTS

| | | |
|---|---|---|
| 3,419,747 A | 12/1968 | Green |
| 3,714,439 A | 1/1973 | Williams et al. |
| 3,790,844 A | 2/1974 | Nevin |
| 4,513,441 A | 4/1985 | Henshaw |
| 4,578,765 A | 3/1986 | Barker |
| 5,267,324 A | 11/1993 | Kumagai |
| 5,559,862 A | 9/1996 | Bhagat et al. |
| 5,659,595 A | 8/1997 | Chanu et al. |
| 5,798,830 A | 8/1998 | Srinivasan |
| 6,151,507 A | 11/2000 | Laiho et al. |
| 6,351,556 B1* | 2/2002 | Loui ............ G06K 9/4647 382/164 |
| 6,542,730 B1 | 4/2003 | Hosain |
| 6,771,954 B1 | 8/2004 | Yoneyama et al. |
| 6,941,323 B1 | 9/2005 | Galperin |
| 6,993,329 B2 | 1/2006 | Cho et al. |
| 7,050,615 B2 | 5/2006 | Avinash et al. |

(Continued)

FOREIGN PATENT DOCUMENTS

| WO | WO2005116910 | 12/2005 |
|---|---|---|
| WO | WO2006122700 | 11/2006 |

OTHER PUBLICATIONS

U.S. Appl. No. 14/329,382, filed Jul. 11, 2014.
U.S. Appl. No. 61/820,800, filed May 8, 2013 by Paul Zsebedics.

*Primary Examiner* — Alan S Miller
(74) *Attorney, Agent, or Firm* — Dovas Law, P.C.

(57) ABSTRACT

A task management system and method that enables task assignment, that supports task monitoring, that produces task reminders, that verifies task completion, and that assigns rewards or penalties based on task performance. The task management system implements a method of receiving an indication of a particular task to be completed and first image data that corresponds to the particular task. The method further includes receiving second image data that corresponds to a second image, and processor comparing the first image data and the second image data. The processor can determine whether the particular task is completed based on comparing the first image data and the second image data. A notification indicating whether the particular task is completed is then sent.

24 Claims, 10 Drawing Sheets

(56) References Cited

U.S. PATENT DOCUMENTS

| | | | |
|---|---|---|---|
| 7,190,814 B2 | 3/2007 | Miichi et al. | |
| 7,227,973 B2 | 6/2007 | Ishiyama | |
| 7,313,276 B2* | 12/2007 | Simelius | A63F 13/12 382/181 |
| 7,319,790 B2 | 1/2008 | Ono | |
| 7,536,064 B2 | 5/2009 | Venkatesan | |
| 7,577,246 B2* | 8/2009 | Idan | H04M 3/5175 379/265.01 |
| 7,657,077 B2 | 2/2010 | Michelsson et al. | |
| 7,689,465 B1* | 3/2010 | Shakes | G06Q 10/08 705/27.1 |
| 7,720,258 B1 | 5/2010 | Ullmann | |
| 7,873,357 B2 | 1/2011 | Herrero Veron | |
| 7,885,844 B1* | 2/2011 | Cohen | G06Q 10/10 |
| 7,945,470 B1* | 5/2011 | Cohen | G06Q 10/06 455/433 |
| 8,005,697 B1* | 8/2011 | Cohen | G06Q 10/06 705/7.13 |
| 8,027,662 B1* | 9/2011 | Miller | H04L 67/18 455/17 |
| 8,077,187 B2 | 12/2011 | Bezryadin et al. | |
| 8,098,957 B2 | 1/2012 | Hwang et al. | |
| 8,229,230 B2 | 7/2012 | Hayber | |
| 8,375,422 B2 | 2/2013 | Sennett et al. | |
| 8,676,640 B2* | 3/2014 | ONeill | A63F 13/12 705/14.11 |
| 8,712,156 B2 | 4/2014 | Bronstein et al. | |
| 8,897,553 B2 | 11/2014 | Lee | |
| 2001/0047286 A1* | 11/2001 | Walker | G06F 19/327 705/7.13 |
| 2002/0010705 A1 | 1/2002 | Park | G06Q 10/10 |
| 2002/0090116 A1 | 7/2002 | Miichi et al. | |
| 2003/0027603 A1* | 2/2003 | Takasaki | H04N 1/2112 455/566 |
| 2003/0028404 A1* | 2/2003 | Herron | G06Q 40/02 705/4 |
| 2004/0161085 A1 | 8/2004 | Horne | |
| 2004/0268381 A1* | 12/2004 | Simelius | A63F 13/12 725/19 |
| 2005/0243771 A1 | 11/2005 | Hardy et al. | |
| 2006/0106774 A1* | 5/2006 | Cohen | G06Q 30/06 |
| 2006/0117263 A1 | 6/2006 | Locke | |
| 2006/0136236 A1* | 6/2006 | Horton | G06Q 10/08 705/330 |
| 2006/0206413 A1* | 9/2006 | Van Luchene | G06Q 20/10 705/37 |
| 2006/0206895 A1* | 9/2006 | Gray | G06Q 10/00 718/102 |
| 2006/0259421 A1* | 11/2006 | Maass | G06Q 20/10 705/39 |
| 2007/0150567 A1 | 6/2007 | Lamparello et al. | |
| 2007/0226029 A1* | 9/2007 | Gross | G06Q 40/00 705/35 |
| 2007/0232340 A1 | 10/2007 | Yamauchi et al. | |
| 2008/0013837 A1 | 1/2008 | Porter et al. | |
| 2008/0172317 A1 | 7/2008 | Deibert et al. | |
| 2008/0293397 A1 | 11/2008 | Gajdos et al. | |
| 2009/0149203 A1 | 6/2009 | Backholm et al. | |
| 2009/0181716 A1 | 7/2009 | Benco et al. | |
| 2009/0241172 A1 | 9/2009 | Sennett et al. | |
| 2009/0275367 A1 | 11/2009 | Reinisch et al. | |
| 2009/0295562 A1 | 12/2009 | Shuster | |
| 2009/0296904 A1 | 12/2009 | Brewer et al. | |
| 2010/0216509 A1 | 8/2010 | Riemer et al. | |
| 2011/0029352 A1* | 2/2011 | Lau | G06Q 30/0253 705/7.41 |
| 2011/0145927 A1 | 6/2011 | Hubner et al. | |
| 2011/0262028 A1 | 10/2011 | Lipson et al. | |
| 2011/0269452 A1* | 11/2011 | Roumeliotis | H04W 4/021 455/424 |
| 2012/0143496 A1 | 6/2012 | Chitre et al. | |
| 2012/0151047 A1* | 6/2012 | Hodges | G06F 21/604 709/224 |
| 2013/0090964 A1* | 4/2013 | Rivere | G06Q 30/00 705/7.13 |
| 2013/0090966 A1* | 4/2013 | Rivere | G06Q 10/06311 705/7.15 |
| 2013/0102286 A1 | 4/2013 | Toksvig et al. | |
| 2013/0151628 A1 | 6/2013 | Catalano et al. | |
| 2013/0303143 A1* | 11/2013 | Schrader | H04M 1/72577 455/418 |
| 2014/0025465 A1* | 1/2014 | Herring | G06Q 30/02 705/14.25 |
| 2014/0057610 A1 | 2/2014 | Olincy et al. | |
| 2014/0122150 A1* | 5/2014 | Davis | G06Q 10/06311 705/7.17 |
| 2014/0164037 A1* | 6/2014 | Rao | G06Q 10/103 705/7.13 |
| 2014/0179261 A1* | 6/2014 | Riggs | H04M 1/72577 455/404.2 |
| 2014/0187219 A1* | 7/2014 | Yang | H04W 4/046 455/418 |
| 2014/0194095 A1 | 7/2014 | Wynne et al. | |
| 2014/0258357 A1* | 9/2014 | Singh | H04L 67/10 709/201 |
| 2014/0337077 A1* | 11/2014 | Zsebedics | G06Q 10/06311 705/7.15 |
| 2014/0364153 A1 | 12/2014 | Ren | |
| 2014/0370857 A1 | 12/2014 | Bovis | |
| 2016/0014262 A1 | 1/2016 | Hodges et al. | |

* cited by examiner

TASK MANAGEMENT SYSTEM AND METHOD

BACKGROUND

Ask almost any parent how difficult it is to get their child to do household chores or other tasks and you may get a lively response. Getting children to do their chores and assigned tasks is a major cause of family arguments. But in truth those same parents themselves were likely somewhat less then diligent about doing their assigned chores when they were young.

Nonetheless chores and other assigned task are and remain highly beneficial. They reduce the workload of parents, they instill responsibility in children, the assigned chores or tasks usually need to be done, time is saved, they help integrate children into the household, and they can create the satisfaction that comes with a job being well done. Still, most people can relate to a parent angrily asking why a child's room is not cleaned and the child's often angry response.

Asking a child or teenager to do something, such as remembering to bring their cell phone, to do their homework or to perform an assigned task often fails to achieve the desired result and leads to repeated requests. The advent of smart phones, laptops, tablets and other portable electronic devices only aggravates the problem as a child has other things which distract them from performing their assigned tasks. A child with un-tethered access to the Internet, multiple communication protocols (e.g. phone, video phone, email, text chatting, and text messaging), and a wide variety of digital entertainment seemingly always has something else to do.

Given that the multitude of available electronic devices may distract a child from behaving responsibly, in the prior art parents usually had to physically check whether an assigned task has been or is being completed. This could be difficult or even impossible to do.

Therefore there exists a need for a system that assists parents or others to assign tasks to be performed, to check on the status of one or more assigned tasks, and to determine if an assigned task has been completed.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A task management system is provided which implements a method including receiving an indication of a particular task to be completed and a first image data that corresponds to the particular task. The method further includes receiving second image data that corresponds to a second image, comparing by a processor the first image data and the second image data, determining by a processor whether the particular task is completed based on comparing the first image data and the second image data, and providing a notification indicating whether the particular task is completed.

Further provided is a computing system including a network-connectable server, a first device and a second device. The network-connectable server is configured for receiving an indication of a particular task to be completed, receiving first image data corresponding to the particular task, receiving second image data corresponding to a second image, comparing by at least one processor the first image data and the second image data, determining by the at least one processor whether the particular task is completed based on comparing the first image data and the second image data, and providing a notification indicating whether the particular task is completed. The first device corresponds to a first user and is configured for displaying a plurality of user-selectable tasks, enabling a selection of the particular task from the plurality of user-selectable tasks, transmitting the indication of the particular task to the network-connectable server, and receiving the notification indicating whether the particular task is completed. The second device corresponds to a second user and is configured for associating the second image data with the particular task, and transmitting the second image data to the network-connectable server.

Further provided is a computing system having at least one non-transitory computer readable storage medium having encoded thereon instructions that, when executed by one or more processors of the system, cause the system to perform a process. The process includes receiving an indication of a particular task to be completed; receiving first image data corresponding to a first image corresponding to the particular task; and receiving second image data corresponding to a second image. The process further includes comparing by at least one processor the first image data and the second image data and determining by the at least one processor whether the particular task is completed based on the comparing of the first image data and the second image data. A notification is provided indicating whether the particular task is completed.

Further provided is a method of monitoring at least one sensor of a mobile device corresponding to a first user, predicting by a processor based on the monitoring that the first user does not have the mobile device on the person of the first user, and providing responsive to the prediction a notification to the first user indicating a requirement to charge a battery of the mobile device corresponding to the first user.

BRIEF DESCRIPTION OF THE DRAWING(S)

A more detailed understanding may be had from the following description, given by way of an example with the accompanying drawings. The Figures and the detailed description are not to be considered limiting and other examples are possible. In addition like reference numerals in the Figures indicate like elements wherein.

Figure 2:
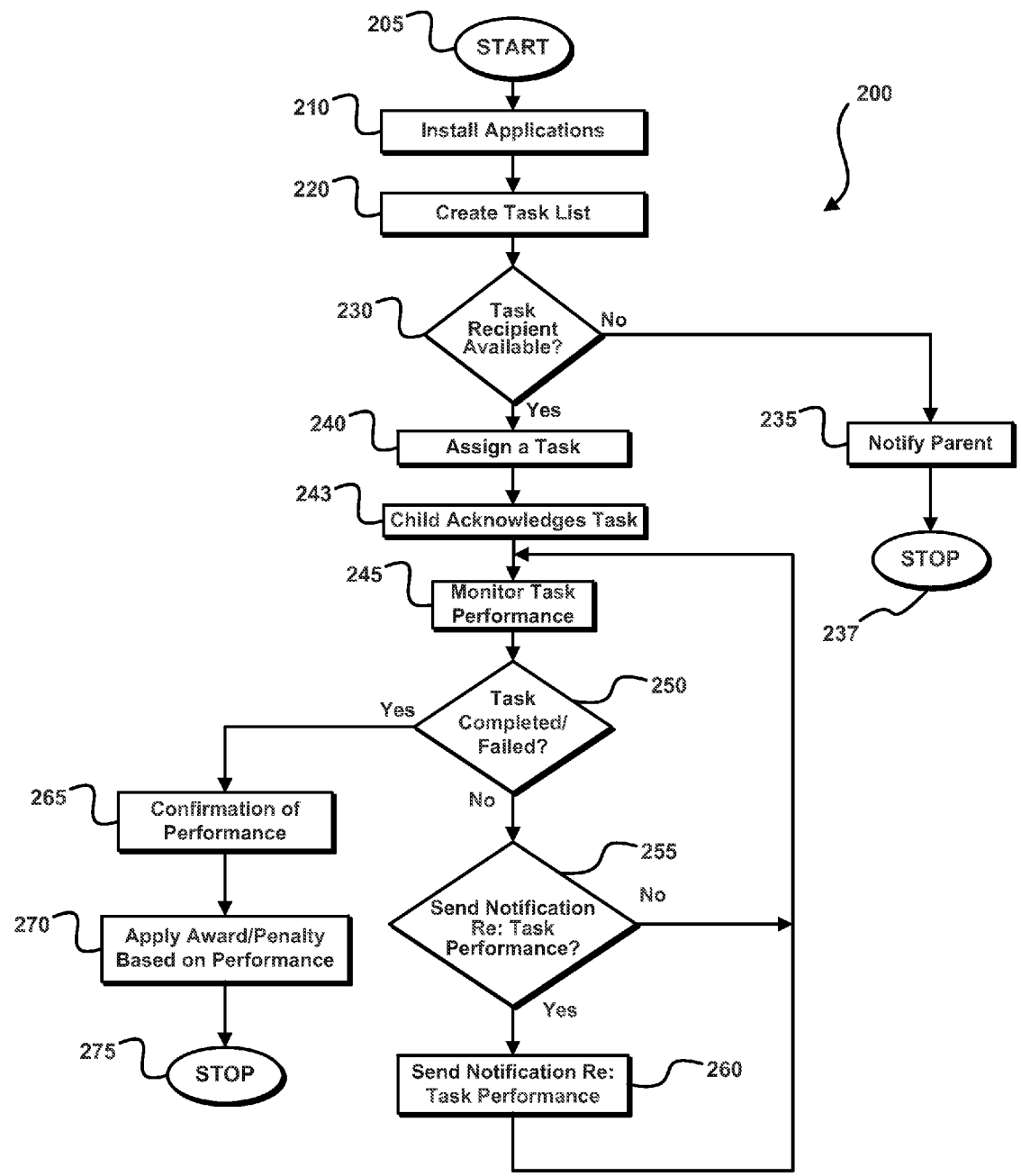
FIG. 2 is a flow chart of operation of a task management process 200.
Figure 7:
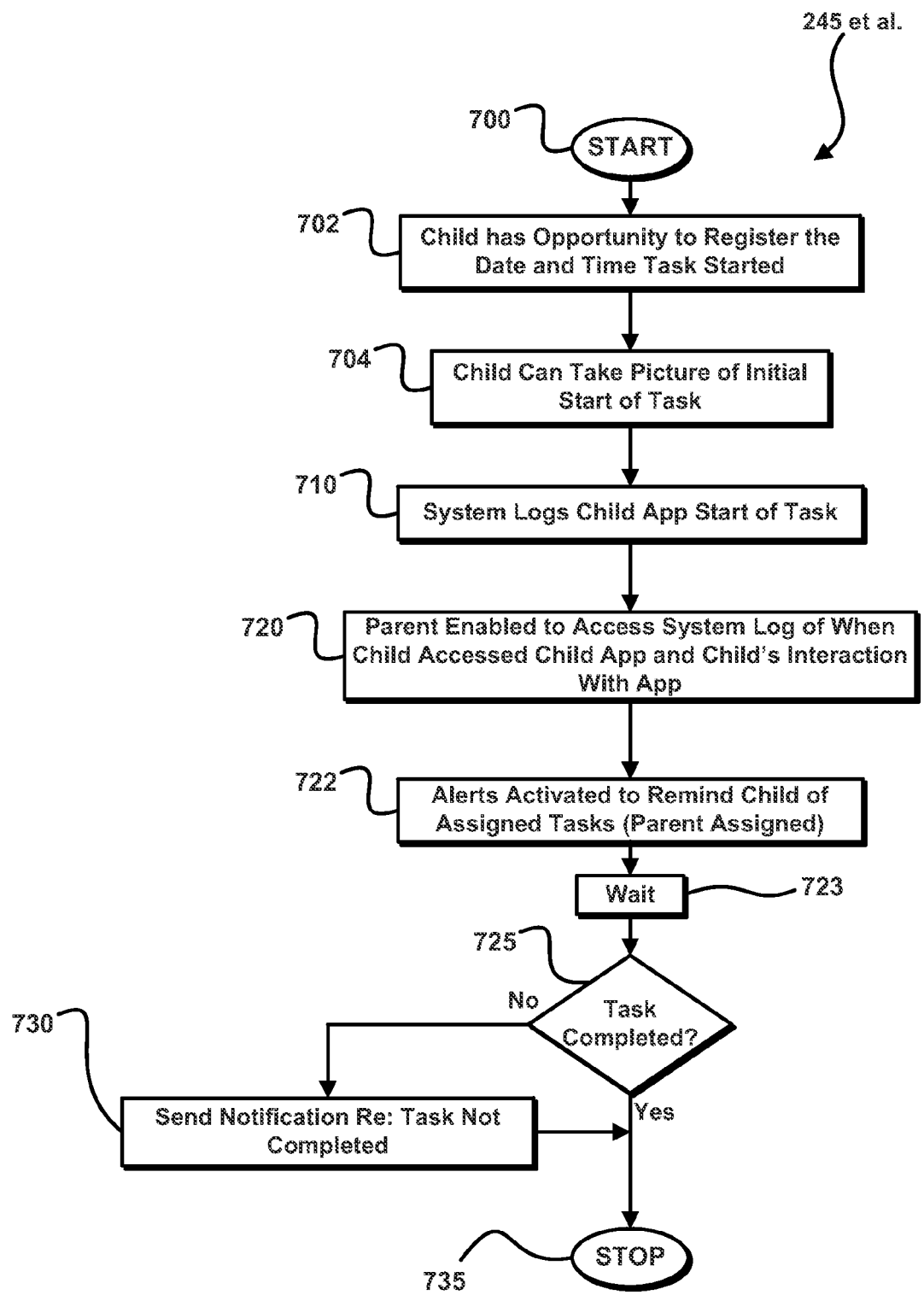
Figure 8:
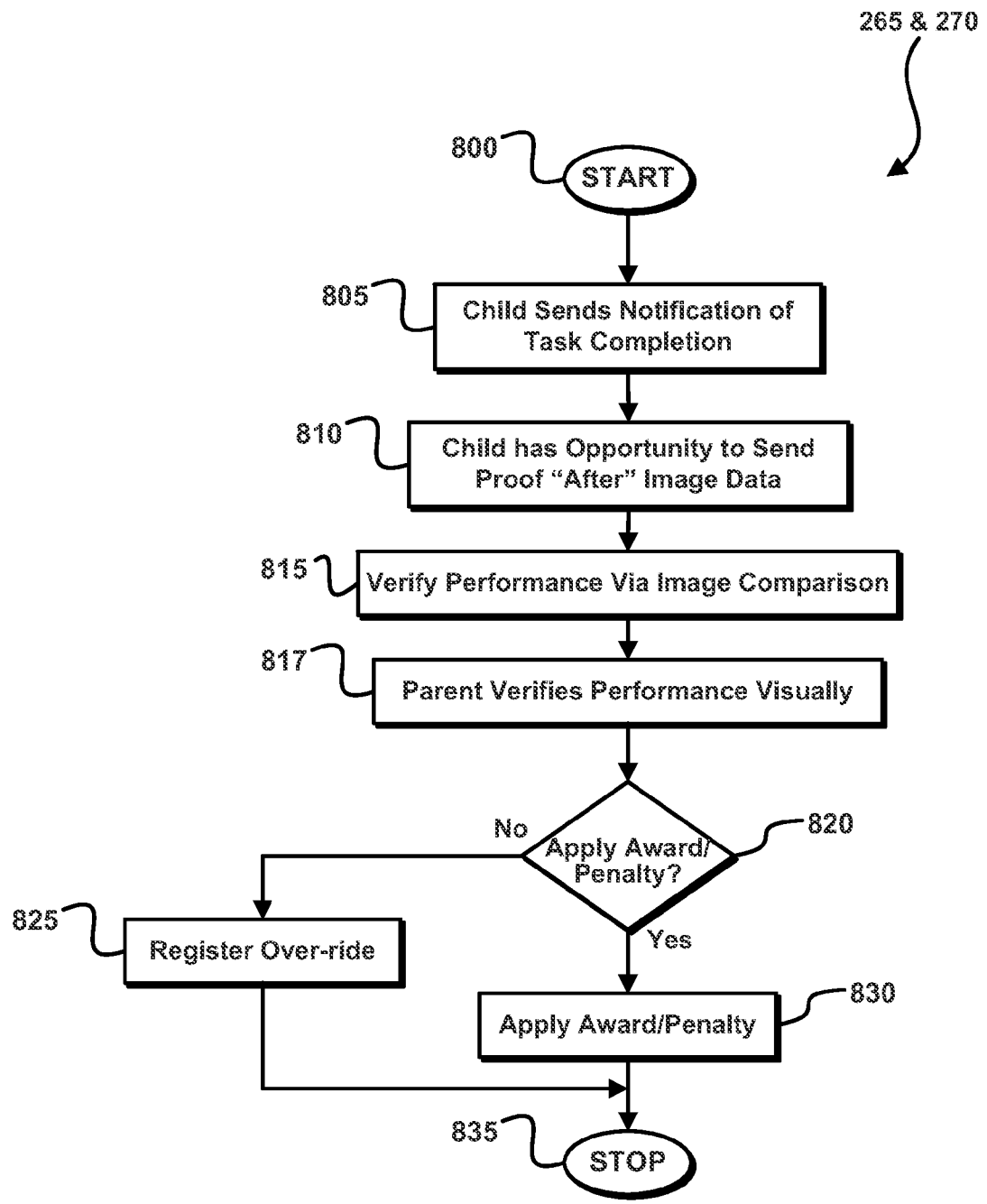

FIG. 7 is a flow chart of steps of determining chore completion, reference steps 265 and 270 of FIG. 2; and FIG. 8 is a flow chart of steps of assigning rewards/punishments, reference step 270 of FIG. 2.

FIGS. 9A-9D and 10 show example displays enabled by the described task management process.

DETAILED DESCRIPTION OF ILLUSTRATIVE EMBODIMENT(S)

Embodiments are described below with reference to drawing FIGS. 1-8. Like numerals represent like elements throughout. In addition, the terms "a" and "an" as used herein do not denote a limitation of quantity, but rather denote the presence of at least one of the referenced items.

A computing system and methods are described herein for reducing the burden of assigning and monitoring the status of assigned tasks. Devices are configured to register an activity or chore that needs to be accomplished, enabling a user such as a parent to assign tasks to another user such as a child. The system monitors that an assigned task is being performed, determines whether or not the task has been completed satisfactorily, and enables rewards or repercussions based on the completion of the assigned task. The system automatically monitors that a user (e.g., a child) has and is carrying a sufficiently charged mobile device (e.g., cellular telephone), automatically sends reminders to charge a mobile device as required, and automatically informs a user (e.g., parent) when a mobile device corresponding to another user (e.g., child) is turned off or is not being carried. The system makes use of date and time stamped visual images to determine task completion. For convenience, the following disclosure uses the words "parent" and "child" to respectively describe first and second users and their respective devices. As is apparent to one of skill in the art, the following described system and methods can be applied to any users irrespective of their personal relationships, for example an employer and an employee or a teacher and a student.

Referring to FIG. 2, a task management process 200 for creating tasks, monitoring task recipient availability, assigning tasks, acknowledging receipt of tasks, monitoring task performance, sending notifications regarding task performance, providing confirmation of task completion, and applying rewards/penalties for task performance is provided.

Figure 1:
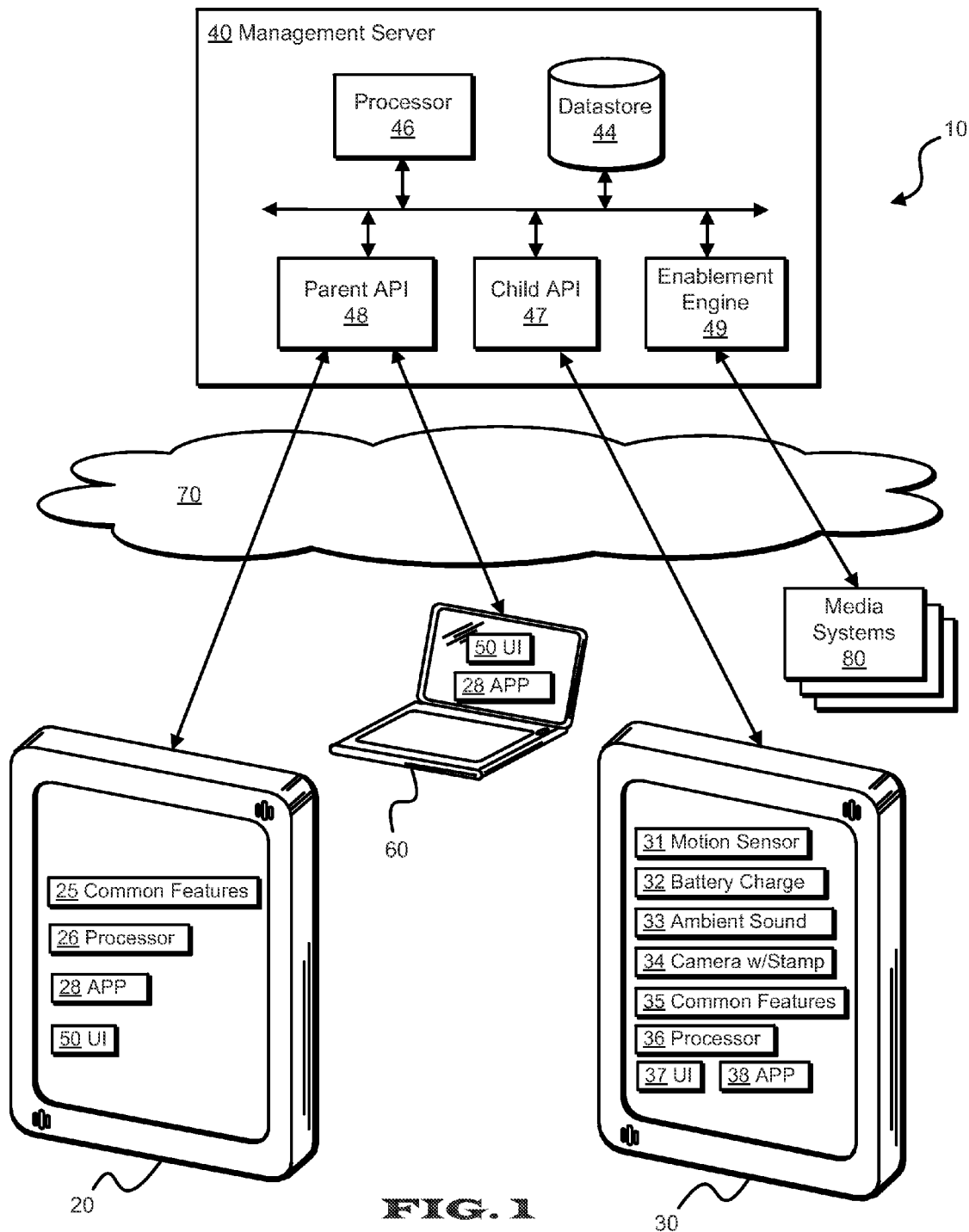
FIG. 1 shows components of a task management system that creates tasks, monitors task recipient availability, assigns tasks, acknowledges receipt of tasks, monitors task performance, sends notifications regarding task performance, provides confirmation of completion, and applies rewards/penalties based on performance.

Referring to FIG. 1, a task management system 10 configured to enable the task management process 200 is shown. The task management process is described with respect to the components of the task management system 10. One skilled in the art will recognize that the task management process 200 can be performed with other suitable components in one or more suitable wired or wireless networks.

The components of the task management system 10 include a parent device 20, a child mobile device 30, and a management server 40, which components operate within a network 70. A parent user interface ("UI") 50 is provided on the parent device 20, or alternatively, the parent UI 50 can be incorporated into another device, for example a terminal 60. A child user interface ("UI") 37 is provided on the child mobile device 30. The parent device 20, the child mobile device 30, the management server 40, and the parent UI 50 all run in accord with individual application software that control processors 26, 36, 46 that operate together to enable the task management process 200. Each processor 26, 36, 46 can comprise one or more processing units residing locally on a single machine or residing on a plurality of machines, for example connected via a network.

Each device 20, 30 can be a mobile terminal such as a cell phone, smart phone, tablet computing device, or any network-connectable communication device. The parent device 20 and the parent UI 50 can be associated for example with a parent of a child who uses the child mobile device 30. Alternatively, the parent device 20 and the parent UI 50 can be associated with any user with supervisory responsibility toward a user of the child mobile device 30. The parent device 20, while depicted as a smart phone, and the terminal 60, while depicted as a laptop computer, can comprise any suitable mobile or non-mobile, wired or wireless terminal. The network 70 can include one or more wired or wireless networks, including for example the internet and wireless carrier systems. The management server 40 includes one or more computing systems, self-contained or distributed across a network, which one or more computing systems include one or more processors and datastores, represented by processor 46 and datastore 44, which enable application program interfaces 47, 48.

The child mobile device 30 includes support for motion sensing and classification 31, support for battery charging and charge measurements 32, support for ambient sound and its classification 33, and a camera that takes time and date stamped images 34. Those features enable a device application 38 to determine that the child mobile device 30 is ON; that it is being carried; that it either has a well-charged battery, that a battery needs charging, or that a battery is being charged; that the battery will or will not power the child mobile device 30 for the day or other time period. The child mobile 30 device further includes common features 35 such as communication capability, a clock, an audible alert, and a visual display.

When operated under the task management process 200 the child mobile device 30 enables a display containing a list of the chores and activities that are to be performed for the day. The device application 38 can communicate with a child API 47 on the management server 40 to obtain the list of chores and activities and list updates. The child mobile device 30 application 38 support alerts, for example, audible alerts at parent configured times before the time at which a task is scheduled to begin. Thus, if the child has a scheduled activity to leave for school by 7:30 am, the parent may configure an alert for 7:20 am using a parent application 28 via a parent API 48 on the management server 40.

The parent device 20 includes common features 25 such as communication capability, a clock, an audible alert, and a visual display. In addition, a parent application 28 enabled by one or more of the parent device 20, UI 50, and management server 40 creates a task list (see below). In addition, a parent will have the ability to re-schedule tasks and to override rewards and penalties associated with completion or non-completion of tasks. One or more of the parent device 20, UI 50, and management server 40 creates and maintains a log of all parent interactions with the parent application 28. In particular, the parent will have a record of how many overrides of penalties were activated on a daily, weekly, or monthly basis or other time period. The application 28 further enables in the UI 50 a "dashboard" showing task performance over the course of a day, week, month or other user-defined time period. Particularly, the dashboard can indicate one or more of tasks initiated by the parent, tasks that the child has accomplished, tasks that the child has yet to accomplish, tasks that the child has failed to accomplish, and overrides activated by the parent.

The parent UI 50 enables the various application software packages to be distributed to the other devices via the management server 40, to enable the task management process 200. In addition, the parent UI 50 can be used by the parent to define a task list and to store tag data associated with items on that list, for example locally or in the datastore 44 of the management server 40.

Tasks can be presented in the parent UI 50 to show age-appropriateness of particular tasks. Example displayed tasks corresponding to children between 2 and 3 may include "put toys away", "fill a pet's food dish", "put clothes in a hamper", "wipe up spills", "dust furniture", and/or "collect and pile up books and magazines". Example displayed tasks corresponding to children between 4 and 5 may include the tasks corresponding to children between 2 and 3 and additionally "make bed", "empty wastebaskets", "bring in the mail or a newspaper", "clear the table", "pull weeds and water plants", and/or "pick up crumbs". Example displayed tasks corresponding to somewhat older children may include the tasks corresponding to children between 2 and 5 and additionally "load the dishwasher", "put away groceries", "vacuum floors", "help make dinner", "make their own snacks", "clean the table after meals", "put away their own laundry", "sew buttons", "make breakfast", "peel vegetables", "prepare simple foods, such as toast", "mop the floor", and "take the dog for a walk". Example displayed tasks corresponding to yet older children and adolescents may include "unload dishwasher", "fold laundry", "clean the bathroom", "wash windows and wash the car", "iron clothes", "do laundry", "baby-sit", "clean the kitchen", "clean the stove", and "change bed sheets". Of course there are numerous other tasks that can be added to the task list. In addition, the term task as used herein generically refers to any chore, job, assignment, or activity.

The task list can include tags including auxiliary data associated with task entries. For example, a useful tag is image data of a clean and tidy room taken at a first time. That tagged image data may be subsequently compared to time stamped image data taken by the child mobile device 30 at a subsequent second time after completion of the task to clean up that room. Ideally the comparison of the tag image data (e.g., of a clean and tidy room) with that image data taken upon completion of the task (e.g., cleaning the room) is performed by a processor, for example the processor 46 of the management server 40. After comparison, the processor determines if the task has been completed and sends a notification indicating whether or not the particular task (e.g., cleaning the room) is complete. Further, the parent can receive the image data taken upon completion of a task to enable a visual comparison between the tag image data and the image data sent from the child mobile device 30, such data received through the UI 50 from the management server 40 or direct from the child mobile device 30 via the network 70. The image data taken by the child mobile device 30 and the associated time stamp is rendered tamper-proof, for example via the child application 38, to prevent a child from providing an earlier non-current image corresponding to the completed task (e.g., showing a clean and tidy room) or otherwise tampering with an image such that an incomplete task appears complete.

In addition to a clean and tidy room, tag image data can correspond to other tasks. For example, tag image data can correspond to a made bed, emptied waste baskets, vacuumed floors, a prepared meal, an unloaded dishwasher, changed bed sheets, or any visually confirmable task. Tag images may further correspond to destinations, for example the location where it is desired to walk the dog, wherein the image data is taken using the child mobile device 30 when the child arrives at the particular location (e.g., with the dog), and a comparison between the tag image data and image data later taken by the child mobile device 30 confirms completion of the task. Alternatively, the image data can be taken using the child mobile device 30 at an estimated farthest distance from a particular starting point, which taken image data compared with tag image data can enable determining whether a task (e.g., walking a dog a particular minimum distance) is completed.

The image data comparison can be performed by the processor 46 in the management server 40 or the processor 26 in the parent device 20. Alternatively, the data comparison can be performed in any component in the system 10. The tagged image data is received and stored in a datastore 44, the image data taken upon completion of the task (e.g., cleaning the room) is received, and the determination that the task has been completed is based at least partially on whether the image data taken upon completion of the task depicts an image related to the tagged image data.

Still referring to FIG. 1, the management server 40 handles the reception and re-transmission of information between the parent device 20, the child mobile device 30, and the parent UI 50. As noted, the management server 40 receives and distributes information from the parent UI 50 as required to implement the process 200 and it may also perform a comparison of tagged image data with image data supplied after completion of a task. In addition, the management server 40 may store tag images and images received from the child mobile device 30 in the datastore 44 for comparison.

FIG. 2 provides an operational flow chart of the steps and methods of the task management process 200. FIGS. 3-8 provide more details about the steps shown in FIG. 2. Thus FIGS. 3 through 8 should be understood as providing sub-steps to the operational flow chart shown in FIG. 2.

As shown in FIG. 2 the task management process 200 starts, step 205, and proceeds to installing the required applications, step 210. Installing means that the various software applications get distributed to the various components, they get loaded onto those components; the various devices check themselves for suitability to run the task management process 200, and then integrating the various components for performance of the task management process 200.

Following component installation, step 210, the task management process 200 proceeds by creating a task list, step 220. A task list is a listing of tasks the parent may wish to assign to a child. As mentioned, the task list may be age dependent. However, it may also depend on the needs of the parent, the interests of the child, requirements placed on the family by outside influences such as a school, church, a government entity or any of a wide number of other sources for tasks. Also as noted, the task list need not be directed to a parent-child relationship. For example, a manager may assign a task to an employee. In any event the task list may include performance time windows (e.g., time allotted to clean a room), and automatically assigned rewards for completion or penalties for not completing, or other factors.

A task list is filled by enabling a user interface on a computing device, such as on the parent UI 50 or on the parent device 20, to generate a plurality of tasks. This task list will enable the parent to select from the plurality of tasks in the task list using the user interface. Once selected by the parent, the particular task to be completed is selected by the child via the user interface 37 of the child mobile device 30.

The task list created in step 220 supports tags: data information associated with tasks. In particular, the task list supports image data tags. An image data tag is data representing a task, such as image data showing a clean and tidy room. Such image data tags can be used subsequently to determine task completion.

Assigning a task requires the child to be available to receive the task. Before a task is assigned, the task management system 10, for example via the management server 40, checks if the task recipient is available, step 230. This may be accomplished by the parent device 20, the management server 40, or the parent UI 50 attempting to call the child mobile device 30. If the task recipient is not available, a notification of unavailability is sent to the parent device 20 and/or the parent UI 50, step 235. This enables the parent to take corrective action as required. If a child is not available, the task management process 200 stops, step 237. Determining if a task recipient is available is explained in more detail subsequently.

If in step 230 the task recipient is available, the parent assigns the child a task, step 240. In practice more than one task may be assigned and the completion of one task may depend on the occurrence of another event, such as completion of another task. But for simplicity of explanation it will usually be assumed that one task is assigned. When assigning a task, a parent can use the parent UI 50 or device 20 to assign the task, to set the required time of completion (or override the time of completion tag associated with the assigned task), and set (or override) the assigned rewards for completion and penalties for not completing the task. Examples of a task may include a requirement that the bathrooms must be cleaned by Saturday at 1 PM or that the lawn must be mowed after the Saturday baseball game.

To encourage performance of the task, the time of completion and the reward/penalty is transmitted to the child mobile device 30 via the management server 40. The time of completion represents a particular time window for completion of the particular task. Thus the proof of completion must be sent during the time of completion.

A penalty may take the form of partially or fully disabling an application or functional component of the child mobile device 30 or applications or functional components associated with any device or system associated with the child. The application 38 can for example disable a particular application or functional component of the child mobile device 30 as a penalty based on instructions from the management server 40. Functional components of a mobile device preferably include software or hardware driven features, settings, capabilities and resources. Different mobile devices may correspond to different functional components. A penalty can take the form of any limitation to the operation of the mobile device. Likewise, a reward may take the form of partially or fully enabling an application or functional component of the child mobile device 30 or an application or functional component associated with any device or system associated with the child. An application or functional component previously disabled may be enabled as a reward.

With the task assigned (step 240) the task management process 200 enables a child to acknowledge the assigned task, step 243, using the child mobile device 30. For example, the child might acknowledge the task, create "before" image data of the task (such as the condition of a room before the start of cleaning) using a camera on the mobile device 30, ask for a delay, demonstrate impossibility of performance, or provide other feedbacks. The assigned task is added to the child's task list.

Next the task management system 10 begins monitoring task performance, step 245, for example via the management server 40. The task management system 10 monitors whether the child cell 30 has indicated task completion, step 250. If not, the task management process 200 determines if a notification regarding task performance should be sent from the child mobile device 30, step 255. If so, such as the time for completion is approaching or a timed reminder has been set, the child mobile device 30 produces appropriately timed alerts reminding the child that the task must be performed, step 260, which alerts can originate for example from the management server 40. After the notification is sent and the alert sounds in step 260, or if a notification was determined not to be needed in step 255, the task management process 200 returns to step 245 to continue monitoring task performance.

If in step 250 the task is found to be completed, or if the time for performance has passed, the task management process 200 determines a confirmation of task completion or no completion, step 265. Then the appropriate reward and/or penalty is automatically applied unless the parent overrides the reward/penalty, step 270. The task management process 200 then stops, step 275.

The operation flow chart of FIG. 2 provides the operations of the task management process 200. A better understanding of the task management process 200 is obtained by understanding FIG. 2 in combination with FIGS. 3-8.

Figure 3:
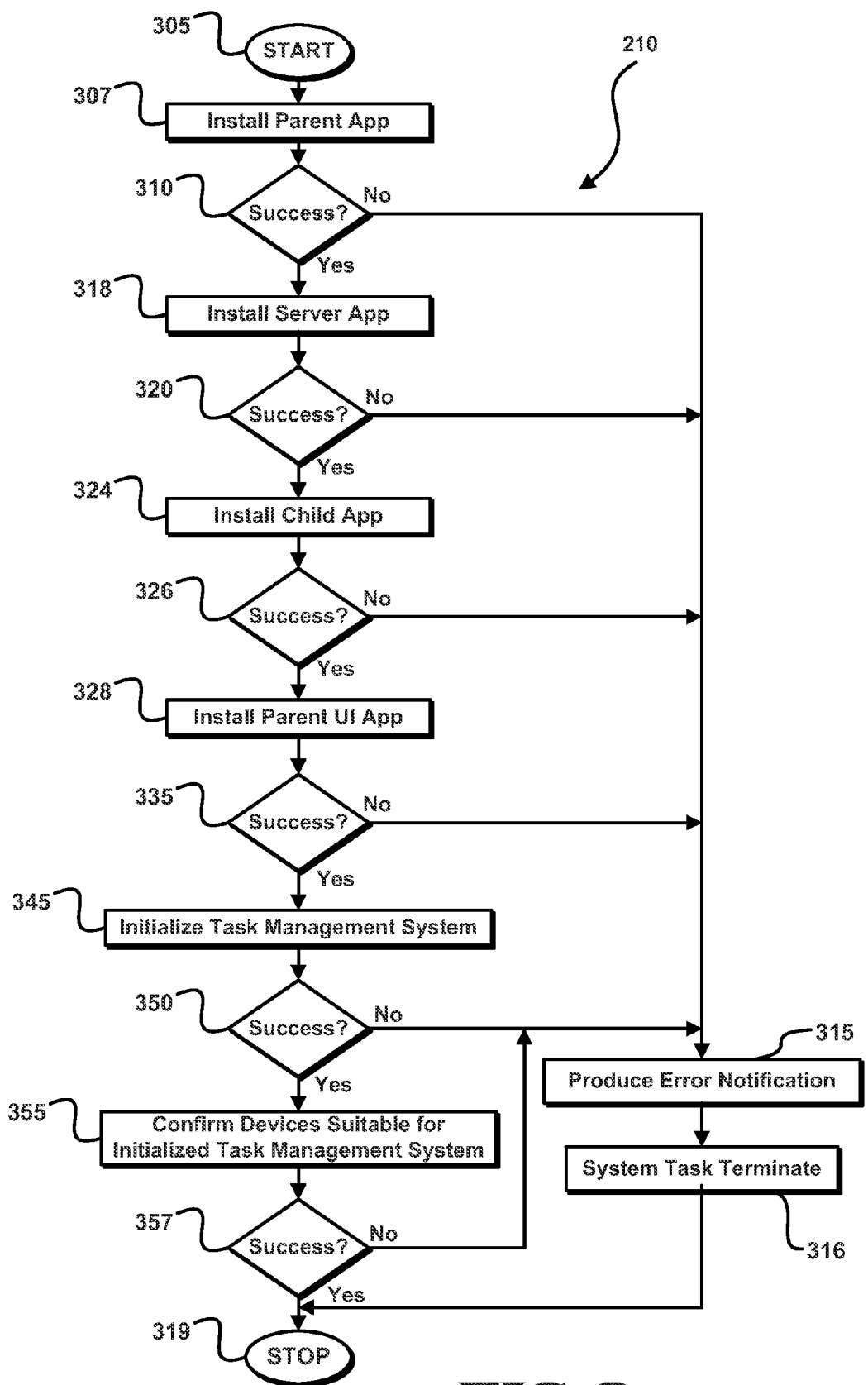
FIG. 3 is a flow chart of steps of installing applications for performing a task management process 200, reference step 210 of FIG. 2.

Referring now to FIG. 3, the step 210 of installing applications for performing the task management process 200 starts at step 305. The parent application is installed on the parent device 20, terminal 60, or other mobile or non-mobile computing system, step 307, and a determination is made if the installation was successful, step 310. One reason installation of the parent application might be unsuccessful is if the parent device 20 cannot support its required operation. Next, the server application is installed on the management server 40, step 318. A determination is then made if that installation was successful, step 320.

After successful completion of step 320 the child application is installed on the child mobile device 30, step 324. A determination is then made whether that installation was successful, step 326. The parent UI application is then installed on the parent UI 50, step 328. A determination is then made if that installation was successful, step 335. After successful completion of step 335, the task management process 200 is initialized, step 345.

Initialization is achieved when all system components can properly communicate and pass messages and data through the management server 40. Next, with the task management process 200 initialized a determination is made as to whether initialization was successful, step 350.

With the task management process 200 successfully initialized a self test is performed to confirm that all devices are suitable to run the particular task management process 200, step 355. For example, the child mobile device 30 must have sufficient resources to achieve all of the operational goals provided both above and below. A check is then made as to whether the devices are suitable for the task management system 220, step 357. If the devices are all suitable and pass step 357, the operation of step 210 stops, step 319.

However, if the parent application is not successfully installed, step 310; or if the server application is not properly installed, step 320; or if the child application is not successfully installed, step 326; or if the parent UI application is not properly installed, step 335, of if the initialization test fails, step 350, or if one or more devices is not suitable, step 357, the task management process 200 produces an appropriate error notification, step 315. Then, the task management process 200 terminates step 316 and step 210 stops, step 319.

Figure 4:
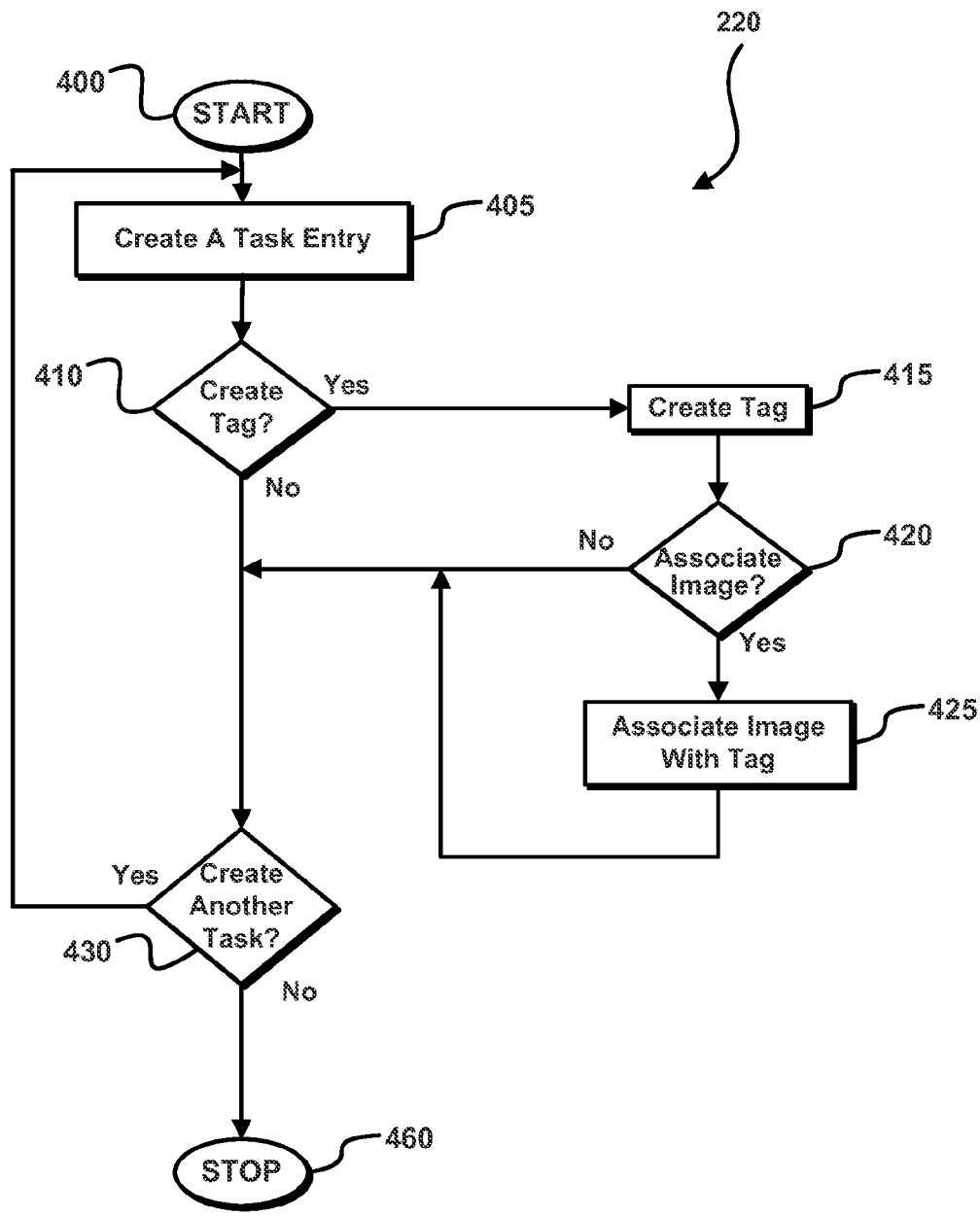
FIG. 4 is a flow chart of steps of creating a task list, reference step 220 of FIG. 2.

FIG. 4 presents a flow diagram of how a task list is created in step 220. Creating a task list starts, step 400, and proceeds by creating a task entry in a table, step 405. A determination is then made whether the task entry entered in step 405 should have a tag associated with it, step 410. A typical tag might be the length of time allotted for completion of the task, a predetermined reward/penalty, or image data. If yes, an associated tag is created, step 415. If that tag is or includes image data, a determination is made to whether to enter an associated image, step 420. If yes, image data is associated with that tag, step 425.

After step 425, or if there is no tag, step 410, or if there is a tag but that tag does not include an associated image, step 420, the operation of step 220 proceeds to a determination as to whether another task is to be entered, step 430. If yes, a return is made to step 405 for the creation of another task. If another task is not to be created step 220 stops, step 460.

Figure 5:
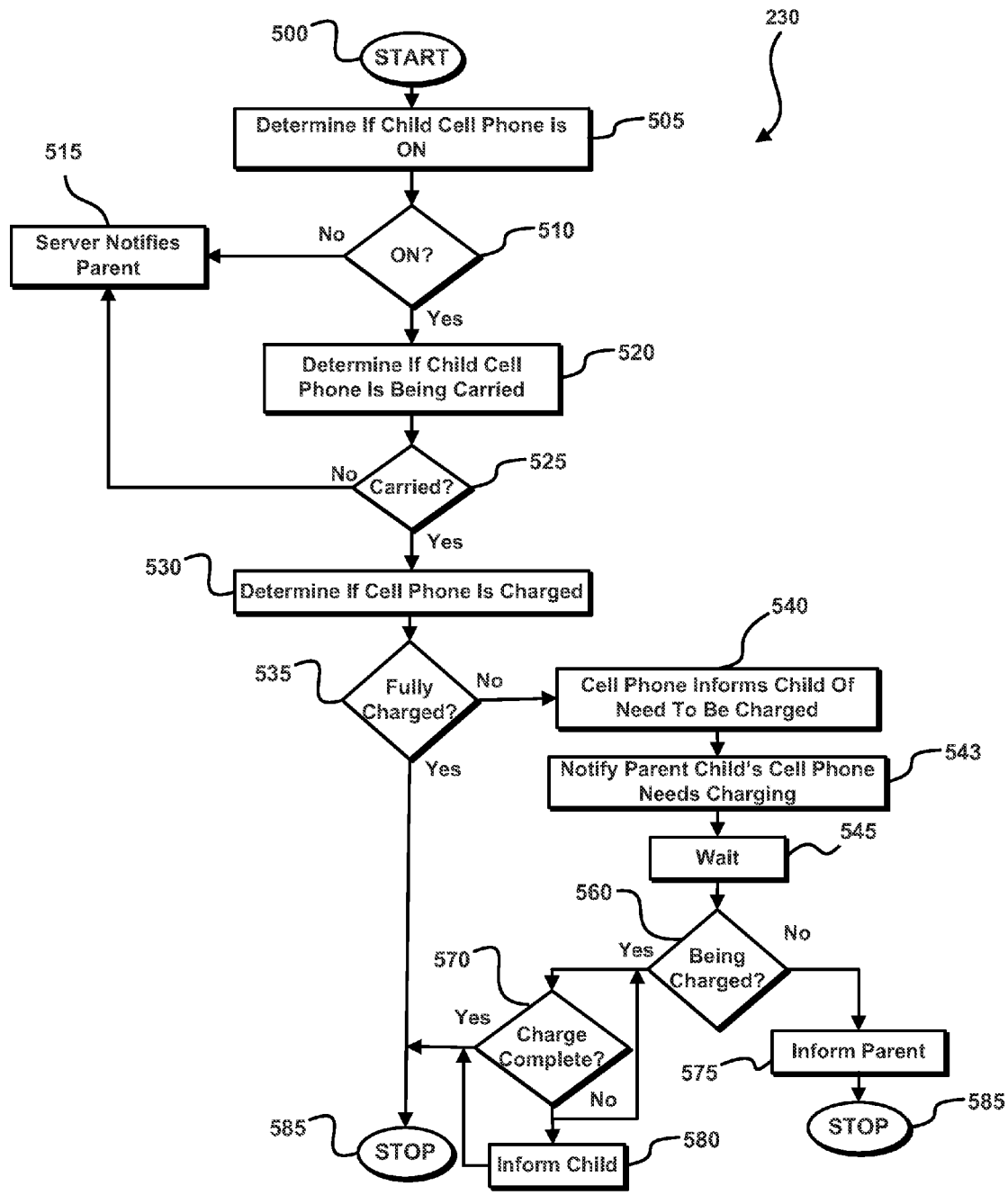
FIG. 5 is a flow chart of steps of assigning a chore, reference step 240 of FIG. 2.

FIG. 5 presents a flow diagram of how a check of task recipient availability is performed, step 230. The process starts, step 500, and proceeds by determining if the child mobile device 30 is ON, step 505. For example, a parent device 20 may attempt to communicate with child phone. If the child phone is not available, the parent is notified and step 505 results in a determination that the child mobile device is OFF. If the child mobile device 30 is ON, step 510, operation proceeds by determining if the child mobile device 30 is being carried, step 520. This is performed by the child mobile device 30 itself based on its motion system (see FIG. 1) determining that the child mobile device 30 motion is indicative of a mobile device being carried. A classifier can be trained for such purpose, which classifier can be implemented to determine motion indicative of a carried mobile device. This state is logged into the system. If the child mobile device 30 is being carried, step 525, operation proceeds by determining if the child mobile device is fully charged, step 530.

However, if the child mobile device 30 is determined not to be ON, step 510, or if after some parental preset time the child mobile device 30 determines it is not being carried, step 525, operation proceeds by the management server 40 notifying the parent device 20 and/or the parent UI 50 that the child is unavailable, step 515. The parent can then take appropriate action such as contacting the child and informing that child to get the child mobile device 30 and charge it if required. Operation then stops, step 585.

Step 530 is the determination of whether the child mobile device 30 is fully charged. Fully charged is not necessarily 100% charged, but rather if the child mobile device 30 is sufficiently charged that the child can receive a task, perform the task, report task completion, and accept the reward or penalty. Determining if the child mobile device 30 is fully charged is accomplished in the child mobile device 30 using its battery charge measurement. In any event, if the charge on the child mobile device 30 drops below some minimum level, regardless if the device is being carried by the child, the child will be notified that the device requires charging.

If the battery is determined to be not fully charged, step 535, the child mobile device 30 informs the child of the need to be charged, step 540. The parent device 20 and the parent UI 50 are then informed, for example by the management server 40, that the child mobile device 30 is not fully charged and is in need of a charge, step 543. This enables the parent to delay task assignment and notifies the parent that until the child mobile device 30 is charged the task cannot be completed and reported.

After the parent is so informed, a waiting period is run to give the child sufficient time to start charging the child mobile device 30, step 545. The waiting period is based on the common clocks found in cell phones. After the waiting period is over a determination is made as to whether the child mobile device 30 is being charged, step 560. If the child mobile device 30 is not being charged, the management server 40 notifies the parent device 20 and/or the parent UI 50 that the child has not started charging the device, step 575. This provides the parent with an opportunity to take corrective action such as notifying the child of the need to charge and/or reducing the time available to the child to perform an assigned task. After step 575, the operation of step 230 stops, step 585.

If in step 560 it is found that the child mobile device 30 is being charged a determination is made as to whether the battery charge is complete. If charging is complete the operation stops, step 585. If not, a delay is performed by looping back to step 570 until the battery charge of the child mobile device 30 is sufficient to accept and perform tasks.

Figure 6:
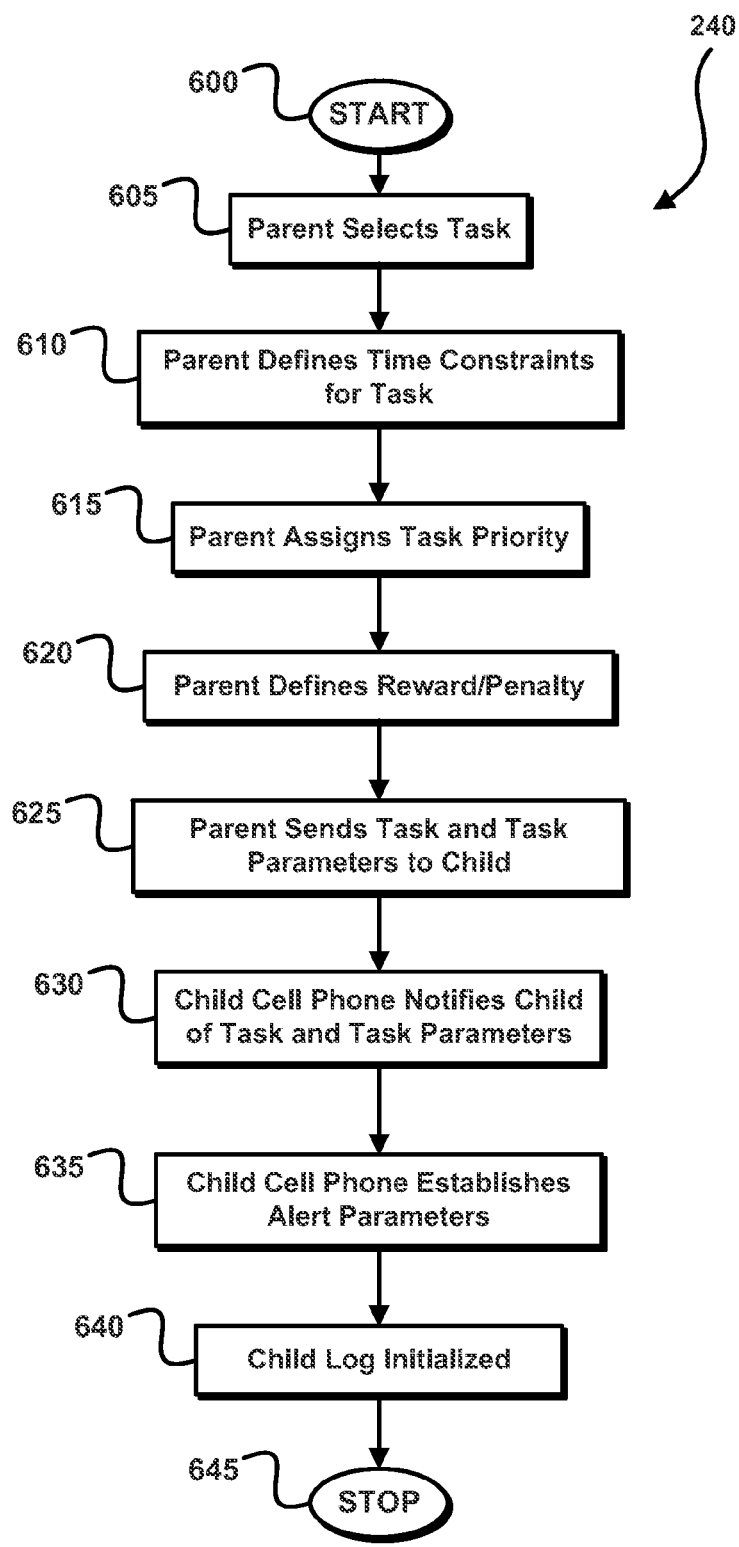
FIG. 6 is a flow chart of steps of monitoring chore performance, reference steps 245-260 of FIG. 2.

FIG. 6 presents a flow diagram of how a task is assigned, step 240. Step 240 starts step 600 and proceeds by a parent selecting a task from the task list, step 605, for example generated via the management server 40. The parent defines the time constraints for performing the task or accepts the time tag associated with the task, step 610. The parent then assigns the task a priority, step 615. There may be more than one task that has been or will be assigned. The parent then defines the reward for performing the task or the penalty for not performing the task, step 620. This may be performed by creating the reward/penalty or by accepting the reward/penalty tag associated with the task.

Once the task has been selected and its parameters set the task and the task parameters are sent to the child mobile device 30, step 625, for example via the management server 40. The child mobile device 30 then notifies the child of the task and the task parameters, step 630. In addition, the child mobile device 30 establishes the alert parameters, step 635. This is the frequency at which the child will be "nagged" about performing the task. Nagging alerts can be set up to be more frequent as the time for completion nears. In addition, a child log is initialized, step 640. The child log is a time stamp of when the child received the task, the number and times of alerts, and each time the child has reviewed task information. The step of assigned tasks then stops, step 645.

FIG. 7 presents a flow diagram of how the task management process 200 monitors task performance and task completion, steps 245 et al. The monitoring starts, step 700, with the child having an opportunity to register the date and time the assigned task started, step 702. While this step is optional it does provide the child with an opportunity to show the parent how long a particular task takes, to show his willingness to start an assigned task, to show that he is not able to immediately accept another task, and to provide feedback to the parent.

The child is also provided with an opportunity to create image data of the task at the start of the task, step 704. This enables the child to provide the parent with "beginning" information about the task dimensions (i.e. a very messy room or a large pile of books to be picked up). Again, this enables the child to provide information regarding the task to the system, and if so configured to the parent.

Whether the child registers the data and time of the start of the task, step 702, or provides image data, step 704, the start of the task assignment is logged, step 710. The parent can then access log information to find out when the child accessed the child application and the child's interaction with the application, step 720. This enables the parent to monitor receipt of the task by the child and track how the child interacts with the system. In addition, the task management system 10 begins to alert ("nag") the child regarding task completion, step 722.

After step 722, the task management system 10 waits until either the child reports task completion or the time for performance (performance window) has passed, step 723.

A decision is made as to whether the task has been reported completed by the child or the time for performance has passed, step 725. If the task has been reported completed, the steps for monitoring task performance stops, step 735. If the time for performance has run out, a notification is sent to the parent device 20 and the parent UI that the task was not completed in time, step 730. The steps for monitoring task performance then stops, step 735.

FIG. 8 presents a flow diagram of how the task management system 10 provides confirmation of performance, step 265, and applies the reward or penalty based on performance, step 270. FIG. 8 starts, step 800, and proceeds with the child sending notification of task completion, step 805. The child is provided with an opportunity to send proof of performance, such as "after" image data, step 810.

Performance is verified in step 815. Verifying performance may involve a processor based comparison (analysis) between first image data, such as a digital image of a room and second image data, such as a picture of the time taken using the camera of the child mobile device 30 after completion of the task. The child mobile device camera takes date and time stamped image data. This enables the system to verify completion on the date and time the child reported task completion. As noted, ideally a processor, be it the management server 40 processor, the parent UI 50 processor or even the parent device 20 processor performs the image data comparison. The first image data is on file, stored as a tag of the task, possibly in the management server 40 or the parent UI 50. The parent has the opportunity to check the image data visually after completion of the task to confirm the image data actually shows task completion, step 817. Alternatively, the processor based comparison can be forgone and verification performed solely by visual inspection of the parent.

After step 817 a decision is made as to whether to apply the reward or penalty, step 820. Penalties may include a child mobile device 30 being locked except for parent designated activities. Typical parent designated activities include the ability to call or text the parent and call or text the police. Alternatively any functional component or application on the child mobile device 30 can be partially or fully disabled as a penalty. In addition, electronics such as computers, televisions, or video games, or services, such as Netflix may be programmed to restrict access by the child, such systems and services labeled media systems 80 on FIG. 1, wherein the management server 40 can be configured to control access of a child to such media systems via an enablement engine 49. To assist that decision, the log of previous overrides are presented to the parent on the parent UI 50. The overall number and dates of prior overrides are presented to the parent along with the number and dates of prior overrides for the particular task. Using this information the parent can decide not to grant either the assigned reward or penalty.

If the reward or penalty is to be applied it is so applied, step 830. The process then stops, step 835. If the reward or penalty is overridden, that override, its date, and the task are registered in the override log for future consideration, step 825. The process then stops, step 835.

Figure 9A:
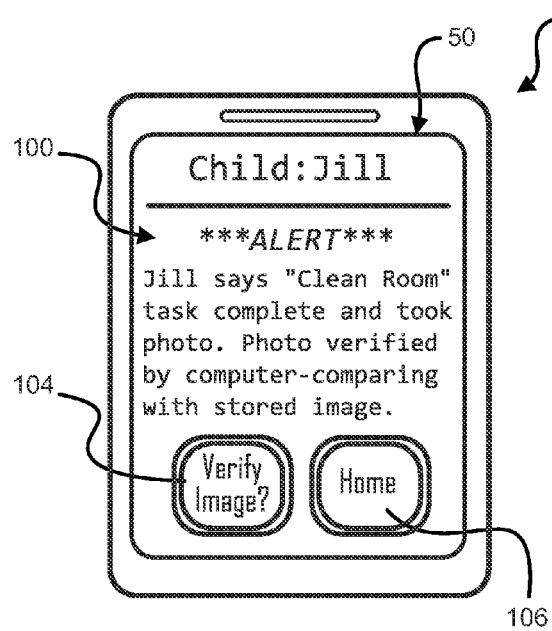

Referring to FIGS. 9A-9D, in implementing the above described processes the parent application 28 can enable a plurality of touch interactive displays, for example displays 100, 110, 120, and 130, via the user interface 50, for example by the parent device 20 accessing data in the management server 40 though the parent API 48. Referring to FIG. 9A, the example display 100 displays the name of a monitored user (e.g., child "Jill") and a message indicating that the monitored user has asserted that a particular task has been completed and that the monitored user has provided current image data corresponding to the completed task, which image data has been system verified, as described above with reference to step 815 of FIG. 8. The monitored user can provide current time stamped image data to the management server 40 via the child application 38 using the camera 34 on the child mobile device 30. The management server 40 performs system verification of task completion based on a comparison of current time stamped image data provided by the monitored user with pre-existing image data in the datastore 44, as described above. A "Verify Image" button 104 is provided to enable a monitoring user (e.g., parent) to view the current image data provided by the monitored user to personally visually verify that the particular task has been completed, as described above with reference to step 817 of FIG. 8. A "Home" button 106 is provided to enable return to a dashboard display, for example the example display 130 in FIG. 9D.

Figure 9B:
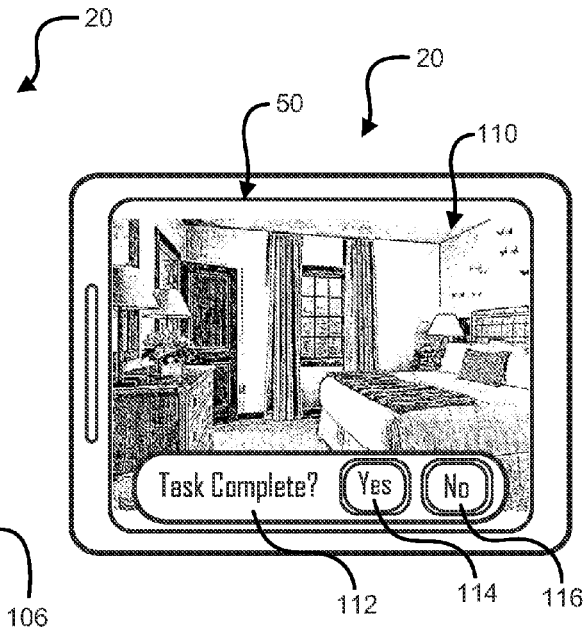

Referring to FIG. 9B, the example display 110 is enabled responsive to a monitoring user (e.g., parent) actuating the Verify Image button 104 shown in FIG. 9A. The example display 110 includes an image corresponding to the current image data provided by the monitored user (e.g., child). A message 112 queries the monitoring user if the displayed image corresponds to a completed task, and "Yes" button 114 and "No" button 116 enable user response to the message.

Figure 9C:
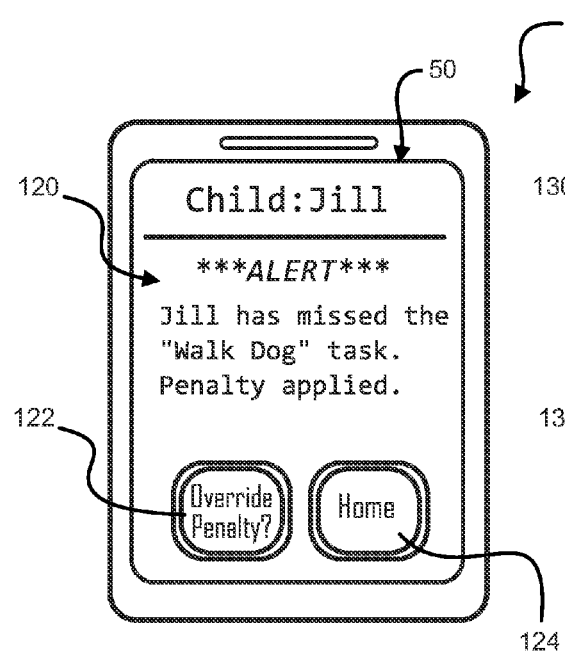

Referring to FIG. 9C, the example display 120 is enabled responsive to a determination that a monitored user has failed to complete a scheduled task. The display 120 provides a message indicating that a particular has not been completed and that a penalty has been applied, for example a penalty of a type described above. An "Override Penalty" button 122 enables a monitoring user to override the penalty, and a "Home" button 124 enables a return to a dashboard display.

Figure 9D:
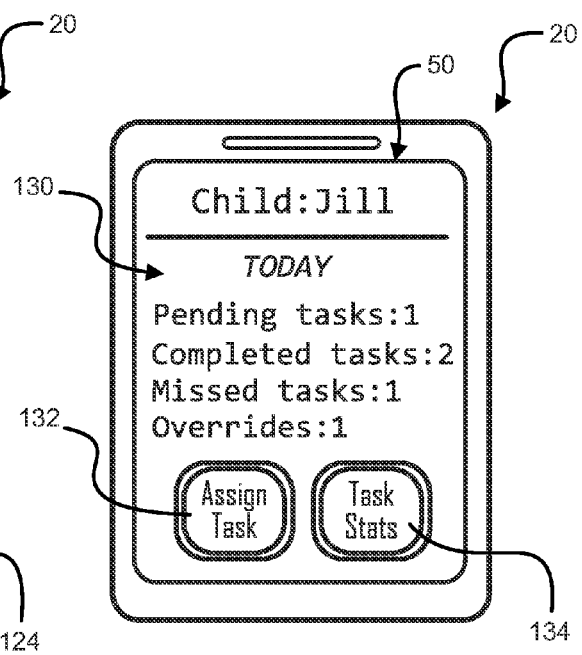

Referring to FIG. 9D, the example display 130 functions as a dashboard display enabled for example at startup of the parent application 28 or responsive to user actuation of a Home button or a particular redirection function during application use. The display 130 is configured to display the name of a monitored user (e.g., child), a number of pending tasks, a number of completed tasks, a number of missed tasks not performed as scheduled or performed improperly or unacceptably, and a number of overrides initiated by the monitoring user (e.g., parent). The display 130 also includes an "Assign Task" button 132 for initiating task assignments corresponding to the monitored user and a "Task Stat" button 134 for displaying task statistics. A monitoring user may also be enabled to switch to a different child by clicking on the "Child" text.

Figure 10:
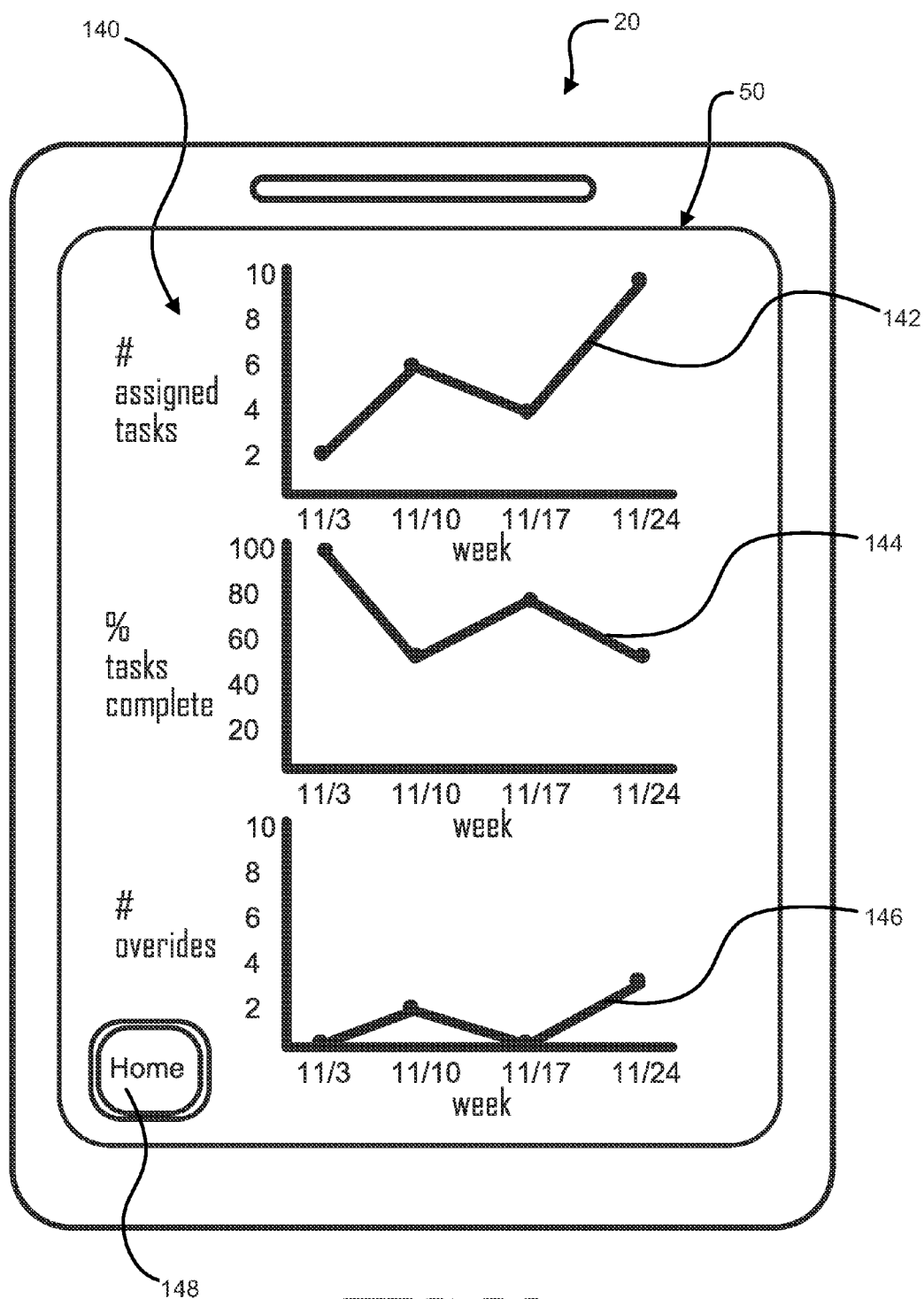

Referring to FIG. 10, an example statistics display 140 is enabled responsive to user actuation of the Task Stat button 134 of FIG. 9D. The display 140 shows example weekly aggregated data in the form of line graphs. Data for the weeks beginning November $3^{rd}$, $10^{th}$, $17^{th}$, and $24^{th}$ is shown. In graph 142, a total number of assigned tasks in each week is plotted. In graph 144, the percent of tasks completed each week is plotted. In graph 146, the number of overrides initiated by a monitoring user in each week is plotted. A home button 148 enables a return to a dashboard display.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:
   receiving an indication of a particular task to be completed;
   receiving first image data corresponding to the particular task;
   receiving second image data corresponding to the particular task captured by a mobile device;
   comparing by at least one processor the first image data and the second image data;
   determining by the at least one processor whether the particular task is completed based on the comparing of the first image data and the second image data;
   disabling at least one of an application or a functional component of the mobile device responsive to determining the particular task is not completed;
   providing a notification to a particular device indicating the particular task is not completed and providing to the particular device the second image data; and
   enabling the particular device to selectively re-enable the at least one of the application or the functional component via a network communication.

2. The method of claim 1, further comprising:
   receiving the first image data from a first user;
   receiving the second image data from a second user; and
   providing a notification to the first user indicating whether the particular task is completed.

3. The method of claim 2, further comprising:
   receiving tag data corresponding to the first image data from the first user;
   determining that the second image data depicts an image related to the tag data; and
   determining whether the particular task is completed at least based on the determining whether the first image data depicts an image related to the tag data.

4. The method of claim 2, further comprising transmitting the second image to the first user.

5. The method of claim 2, wherein:
   the first image depicts an expected appearance of an environment when the particular task is complete, the first image captured at a first time; and
   the second image depicts the environment indicative of the particular task at a second time after the first time.

6. The method of claim 1, further comprising:
   enabling a user interface on a computing device to generate indications of a plurality of tasks;
   enabling user selection of the plurality of tasks via the user interface; and
   receiving the indication of the particular task to be completed responsive to a user selection via the user interface.

7. The method of claim 1, further comprising:
   receiving a time stamp corresponding to the second image data; and
   determining whether the particular task is completed further based on the time stamp.

8. The method of claim 1, further comprising:
   receiving an indication of a particular time window for completion of the particular task;
   determining whether the second image data corresponds to the particular time window; and
   determining whether the particular task is completed within the particular time window based on determining whether the second image corresponds to the particular time window.

9. The method of claim 8, wherein timing of the particular time window is dependent on at least one event.

10. The method of claim 9, wherein the at least one event comprises completion of at least one other task.

11. The method of claim 1, wherein the first image data is received from a first user and the mobile device corresponds to a second user, and the at least one of the application or the functional component of the mobile device is disabled responsive to determining the particular task is not completed at a particular time.

12. The method of claim 11, further comprising:
    enabling a user interface on the mobile device corresponding to the second user, the user interface providing an indication of the disabled at least one of the application or the functional component of the mobile device corresponding to the second user; and
    re-enabling the at least one of the application or the functional component responsive to a request received via the user interface from the second user.

13. The method of claim 1, further comprising:
    receiving the indication of the particular task from a first user;
    providing a display on the mobile device, the mobile device corresponding to a second user, the display comprising a listing including the particular task and an associated time period indicating a time for completion by the second user of the particular task.

14. The method of claim 1, further comprising:
    receiving an indication from a first user of a time for completion of the particular task; and
    providing an alert to the mobile device, the mobile device associated with a second user, the alert indicating the time for completion of the particular task;
    wherein the second image data is received from the second user prior to an expiration of the time for completion of the particular task.

15. The method of claim 1, further comprising:
    receiving from a particular user the first image data and an indication that the first image data depicts an environment indicative of the particular task prior to completion; and
    receiving from the particular user the second image data and an indication that the second image data depicts the environment later in time than the first image data after completion of the particular task.

16. The method of claim 1, further comprising:
    receiving from a first user the first image data and an indication that the first image data depicts an environment substantially as it is expected to appear when the particular task is complete; and
    receiving from a second user the second image data and an indication that the second image data depicts the environment later in time than the first image data after completion of the particular task.

17. The method of claim 1, further comprising:
receiving from a first user the first image data and an indication that the first image data depicts an environment substantially as it is expected to appear when the particular task is complete;
receiving from a second user third image data captured by the mobile device and an indication that the third image data depicts the environment later in time than the first image data prior to completion of the particular task; and
receiving from the second user the second image data, the second image data captured by the mobile device, and an indication that the second image data depicts the environment later in time than the first image data and the third image data after completion of the particular task;
comparing by the at least one processor the first image data, the second image data, and the third image data; and
determining by the at least one processor whether the particular task is completed based on the comparing of the first image data, the second image data, and the third image data.

18. The method of claim 1, further comprising:
providing in a user interface of the mobile device corresponding to a particular user a listing of a plurality of tasks to be completed; and
associating the particular task with the second image data based on a selection by the particular user of the particular task from the listing of the plurality of tasks.

19. The method of claim 1, further comprising:
providing in a user interface of a particular device corresponding to a first user a listing of a plurality of proposed tasks;
enabling selection from the listing by the first user;
providing in a user interface of the mobile device, the mobile device corresponding to a second user, a listing of at least one task to be completed comprising the particular task responsive to a selection by the first user of the at least one task to be completed from the listing; and
associating the particular task with the second image data based on a selection by the second user of the particular task from the listing of the at least one task.

20. A computing system comprising:
a network-connectable server configured for:
  receiving an indication of a particular task to be completed;
  receiving first image data corresponding to the particular task;
  receiving second image data corresponding to a second image;
  comparing by at least one processor the first image data and the second image data;
  determining by the at least one processor whether the particular task is completed based on comparing the first image data and the second image data; and
  providing a notification indicating whether the particular task is completed;
a first device corresponding to a first user configured for:
  displaying a plurality of user-selectable tasks;
  enabling a selection of the particular task from the plurality of user-selectable tasks;
  transmitting the indication of the particular task to the network-connectable server;
  receiving the notification indicating whether the particular task is completed;
  enabling the first user to selectively verify whether the particular task is complete; and
  displaying the second image to the first user;
  receiving an indication of task completion from the first user;
a second device, comprising a mobile communication device comprising a camera corresponding to a second user configured for:
  displaying a listing comprising the particular task and enabling selection of the particular task;
  capturing the second image data by the camera;
  associating the second image data with the particular task based on a selection by the second user of the particular task from the listing;
  transmitting the second image data to the network-connectable server;
  disabling at least one of an application or a functional component of the second device responsive to determining the particular task is not completed; and
  overriding the disabling and re-enabling the second device responsive to the indication from the first user.

21. The computing system of claim 20, wherein the network-connectable server is further configured to generate at least one of a reward or a penalty corresponding to the second user responsive to determining whether the particular task is completed.

22. The computing system of claim 21, wherein the network-connectable server is further configured to provide the second image data to the first user and receive from the first device an override of the at least one of the reward or the penalty.

23. A method comprising:
receiving an indication of a particular task to be completed;
receiving first image data corresponding to the particular task and a time period allotted for task completion from a first user;
capturing by a mobile device of a second user second image data corresponding to the particular task;
transmitting by the mobile device the second image data and a request to modify the time period allotted for task completion from the second user;
capturing by the mobile device third image data;
comparing by at least one processor the first image data and the third image data;
determining by the at least one processor whether the particular task is completed on time based on the comparing of the first image data and the third image data and based on the modified time period allotted for task completion; and
disabling at least one of an application or a functional component of the mobile device responsive to determining the particular task is not completed on time.

24. A method comprising:
receiving an indication of a particular task to be completed;
receiving first image data corresponding to the particular task captured by a first mobile device;
receiving second image data corresponding to the particular task captured by a second mobile device;
comparing by at least one processor the first image data and the second image data;
determining by the at least one processor that the particular task is completed within a particular period of time based on the comparing of the first image data and the second image data;

enabling at least one of an application or a functional component of the first mobile device responsive to determining that the particular task is completed within the particular period of time;

providing a notification via the first mobile device indicating that the particular task is completed and providing to the first mobile device the second image data;

enabling a user to selectively verify via the first mobile device whether the particular task is complete and to transmit an override to the enablement;

receiving by the second mobile device via a network communication an indication of the override; and disabling by the second mobile device the at least one of the application or the functional component based on the override.

* * * * *